US012241309B2

(12) United States Patent
Parker et al.

(10) Patent No.: US 12,241,309 B2
(45) Date of Patent: Mar. 4, 2025

(54) APPARATUS WITH PLATFORM AND LATCH

(71) Applicant: Werner Co., Greenville, PA (US)

(72) Inventors: Thomas W. Parker, Jamestown, PA (US); Brian Wong-Shui, Atlanta, GA (US); Devin Lee Moore, Decatur, GA (US); Christian M. Otis, New Haven, CT (US); Erick E. Rios, New Haven, CT (US)

(73) Assignee: Werner Co., Greenville, PA (US)

( * ) Notice: Subject to any disclaimer, the term of this patent is extended or adjusted under 35 U.S.C. 154(b) by 1276 days.

(21) Appl. No.: 16/678,670

(22) Filed: Nov. 8, 2019

(65) Prior Publication Data

US 2020/0080376 A1 Mar. 12, 2020

Related U.S. Application Data

(60) Continuation of application No. 15/341,749, filed on Nov. 2, 2016, now Pat. No. 10,472,888, which is a (Continued)

(51) Int. Cl.
*E06C 1/387* (2006.01)
*A47C 12/00* (2006.01)
(Continued)

(52) U.S. Cl.
CPC .............. *E06C 1/387* (2013.01); *A47C 12/00* (2013.01); *E06C 1/383* (2013.01); *E06C 1/393* (2013.01)

(58) Field of Classification Search
CPC ......... A47C 12/00; E06C 1/387; E06C 1/383; E06C 1/393; E06C 7/06; E06C 7/16; E06C 7/165
See application file for complete search history.

(56) References Cited

U.S. PATENT DOCUMENTS 1,746,643 A * 2/1930 Foss .......................... E06C 1/12 182/209
1,946,747 A 2/1934 Laborda
(Continued)

FOREIGN PATENT DOCUMENTS

| | | |
|---|---|---|
| CN | 2908669 | 6/2007 |
| EP | 1921249 | 5/2008 |

(Continued)

OTHER PUBLICATIONS

Werner, "AP-20 Aluminum Work Platform Type II", (Feb. 15, 2016), pp. 1-2, URL: https://web.archive.org/web/2016-02-27053413/ http://www.wernerco.com/us/en/view/Products/ClimbingEquipment/ Portable Scaffold/AP/AP-20.
(Continued)

*Primary Examiner* — Colleen M Chavchavadze
(74) *Attorney, Agent, or Firm* — Fitch, Even, Tabin & Flannery LLP

(57) ABSTRACT

A stepladder includes a front section having a first front leg and a second front leg. The stepladder includes a step attached to the first front leg and the second front leg. The stepladder includes a latch engaged with the step. The stepladder includes a rear section having a first rear leg and a second rear leg and a cross bar attached to the first rear leg and the second rear leg. The rear section is pivotably attached to the front section. The rear section has a first stud which extends from the first rear leg toward the second rear leg and separate and apart and not in contact with the second rear leg and not in contact with the cross bar. The latch is engaged with and latched to the first stud to define an engaged position where the first front leg and the first rear leg are in an open position and form an inverted v shape and are prevented from folding together, and the latch when pulled up from the engaged position, disengages from the first stud and allows the front section and rear section to fold
(Continued)

together into a closed position where the first rear leg and the first front leg are in parallel. A method of positioning a step ladder.

20 Claims, 10 Drawing Sheets

Related U.S. Application Data continuation of application No. 14/668,526, filed on Mar. 25, 2015, now Pat. No. 9,488,002, which is a division of application No. 13/738,598, filed on Jan. 10, 2013, now Pat. No. 8,997,931.

(51) Int. Cl.
*E06C 1/383* (2006.01)
*E06C 1/393* (2006.01)

(56) References Cited

U.S. PATENT DOCUMENTS

| | | | | | |
|---|---|---|---|---|---|
| 1,992,391 | A | | 2/1935 | Pease | |
| 2,299,584 | A | | 10/1942 | Low | |
| 2,507,396 | A | | 5/1950 | Boggs | |
| 2,521,114 | A | | 9/1950 | Campbell | |
| 2,596,521 | A | | 5/1952 | Bell | |
| 2,962,111 | A | | 11/1960 | McKinnie | |
| 2,975,857 | A | * | 3/1961 | Suroff | E06C 7/44 182/228.1 |
| 3,016,103 | A | | 1/1962 | Studer | |
| 3,208,553 | A | | 9/1965 | Gray | |
| 4,100,998 | A | | 7/1978 | Marquez | |
| 4,130,316 | A | | 12/1978 | Rossi | |
| 4,155,422 | A | | 5/1979 | Larson | |
| 4,235,449 | A | | 11/1980 | Tarran | |
| 4,320,817 | A | | 3/1982 | Knoke | |
| 4,440,264 | A | | 4/1984 | Knoke | |
| 4,483,415 | A | | 11/1984 | Disston | |
| 4,485,892 | A | | 12/1984 | Maloney | |
| 4,493,392 | A | | 1/1985 | Ralabate | |
| 4,967,877 | A | | 11/1990 | Wallman | |
| 4,989,692 | A | | 2/1991 | Min | |
| 5,052,517 | A | | 10/1991 | Wallman | |
| 5,722,507 | A | | 3/1998 | Kain | |
| 5,762,163 | A | * | 6/1998 | Kain | E06C 1/393 182/162 |
| 5,992,567 | A | * | 11/1999 | Chiu | E06C 1/387 182/161 |
| 6,012,548 | A | | 1/2000 | Kim | |
| 6,026,933 | A | * | 2/2000 | King | E06C 1/393 182/161 |
| 6,039,149 | A | * | 3/2000 | Bedja | E06C 1/397 182/20 |
| 6,347,687 | B1 | * | 2/2002 | Alim | E06C 1/393 182/159 |
| 6,427,805 | B1 | | 8/2002 | Gibson | |
| 6,443,261 | B1 | | 9/2002 | Gibson | |
| 6,550,579 | B2 | | 4/2003 | Gibson | |
| 6,902,035 | B2 | | 6/2005 | Baumgartner | |
| 6,997,282 | B1 | | 2/2006 | Sharp | |
| 7,108,103 | B2 | | 9/2006 | Meeker | |
| 7,690,316 | B2 | | 4/2010 | Yoo | |
| 8,002,084 | B2 | | 8/2011 | Huang | |
| 8,127,890 | B2 | | 3/2012 | Meyers | |
| 8,341,806 | B2 | | 1/2013 | Parker | |
| 8,381,873 | B2 | | 2/2013 | Cross | |
| 8,684,139 | B2 | | 4/2014 | Leng | |
| 8,997,931 | B2 | | 4/2015 | Parker | |
| 9,404,305 | B1 | | 8/2016 | Messick | |
| 9,488,002 | B2 | | 11/2016 | Parker | |
| 9,752,334 | B2 | | 9/2017 | Foley | |
| 10,435,894 | B2 | | 10/2019 | Woodward | |
| 10,472,888 | B2 | | 11/2019 | Parker | |
| 11,808,048 | B2 | | 11/2023 | Woodward | |
| 2003/0057022 | A1 | | 3/2003 | Leng | |
| 2004/0231920 | A1 | | 11/2004 | Meeker | |
| 2004/0238280 | A1 | | 12/2004 | Gibson | |
| 2005/0029050 | A1 | | 2/2005 | Baumgartner | |
| 2005/0284701 | A1 | | 12/2005 | Gibson | |
| 2006/0169539 | A1 | | 8/2006 | Grebinoski | |
| 2007/0181369 | A1 | | 8/2007 | Gibson | |
| 2008/0142301 | A1 | | 6/2008 | Meyers | |
| 2008/0179138 | A1 | | 7/2008 | Parker | |
| 2009/0020360 | A1 | | 1/2009 | May | |
| 2009/0095567 | A1 | * | 4/2009 | Rinna | E04G 1/30 182/124 |
| 2009/0133959 | A1 | | 5/2009 | Eriksson | |
| 2010/0071996 | A1 | | 3/2010 | Huang | |
| 2013/0186709 | A1 | | 7/2013 | White | |
| 2014/0190769 | A1 | | 7/2014 | Parker | |
| 2015/0159434 | A1 | | 6/2015 | Leng | |
| 2017/0044827 | A1 | | 2/2017 | Parker | |
| 2017/0067291 | A1 | | 3/2017 | Leng | |
| 2017/0275897 | A1 | | 9/2017 | Weadward | |
| 2017/0321482 | A1 | | 11/2017 | Simpson | |
| 2018/0355667 | A1 | | 12/2018 | Wang | |
| 2018/0363374 | A1 | | 12/2018 | Woodward | |
| 2020/0032530 | A1 | | 1/2020 | Woodward | |

FOREIGN PATENT DOCUMENTS

| | | | |
|---|---|---|---|
| EP | 2000612 | | 12/2008 |
| FR | 2319003 | A1 | 2/1977 |
| GB | 2152125 | A | 7/1985 |
| GB | 2322897 | A | 9/1998 |
| GB | 2372897 | A | 9/2002 |
| JP | 3030253 | B2 | 4/2000 |
| JP | 2002201794 | A | 7/2002 |
| JP | 2004011126 | | 1/2004 |
| WO | 2006106494 | A1 | 10/2006 |

OTHER PUBLICATIONS

Werner, “AP-20-MP6Work Platform”, (Jan. 2005), pp. 1-2, URL: http://www.wernerco.com/ docs/us/userguides/ap-20.pdf?Status=Master&sfvrsn=2.

* cited by examiner

APPARATUS WITH PLATFORM AND LATCH

CROSS-REFERENCE TO RELATED APPLICATIONS

This is a continuation of U.S. patent application Ser. No. 15/341,749 filed Nov. 2, 2016, now U.S. Pat. No. 10,472,888, which is a continuation of U.S. patent application Ser. No. 14/668,526 filed Mar. 25, 2015, now U.S. Pat. No. 9,488,002 issued Nov. 8, 2016, which is a divisional of U.S. patent application Ser. No. 13/738,598 filed Jan. 10, 2013, now U.S. Pat. No. 8,997,931 issued Apr. 7, 2015, all of which are incorporated by reference herein.

FIELD OF THE INVENTION

The present invention is related to a stepladder that may be securely placed in an open position. (As used herein, references to the "present invention" or "invention" relate to exemplary embodiments and not necessarily to every embodiment encompassed by the appended claims.) More specifically, the present invention is related to a stepladder that may be securely placed in an open position that has a first stud separate and apart from a cross bar that a latch engages to lock the stepladder in the open position.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

It is desirable that a folding stepladder lock securely in the open in-use position so as to prevent accidental folding and possible injury to the user. In addition, a desirable latch design is one that is secure when latched, easily unlatched when the user intends to fold the stepladder, and provides the user an indication that the latch is properly engaged upon opening the stepladder for use. The stepladder latch described here provides these desirable characteristics.

BRIEF SUMMARY OF THE INVENTION

The present invention pertains to a stepladder. The stepladder comprises a front section having a first front leg and a second front leg. The stepladder comprises a step attached to the first front leg and the second front leg. The stepladder comprises a latch engaged with the step. The stepladder comprises a rear section having a first rear leg and a second rear leg and a cross bar attached to the first rear leg and the second rear leg. The rear section is pivotably attached to the front section. The rear section has a first stud which extends from the first rear leg toward the second rear leg and separate and apart and not in contact with the second rear leg and not in contact with the cross bar. The latch is engaged with and latched to the first stud to define an engaged position where the first front leg and the first rear leg are in an open position and form an inverted v shape and are prevented from folding together, and the latch when pulled up from the engaged position, disengages from the first stud and allows the front section and rear section to fold together into a closed position where the first rear leg and the first front leg are in parallel.

The present invention pertains to a method of positioning a stepladder. The method comprises the steps of pivoting a front section having a first front leg and a second front leg relative to a rear section having a first rear leg and a second rear leg and a cross bar attached to the first rear leg and the second rear leg to an open position. The rear section has a first stud which extends from the first rear leg toward the second rear leg and is separate and apart and not in contact with the second rear leg and not in contact with the cross bar. There is the step of engaging a latch to the first stud to define an engaged position where the first front leg and the first rear leg are in an open position and form an inverted v shape and are prevented from folding together. The latch is engaged with a step and the step is attached to the first front leg and the second front leg. There is the step of pulling up on the latch from the engaged position to disengage the latch from the first stud. There is the step of folding the front section and rear section together into a closed position where the first rear leg and the first front leg are in parallel.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
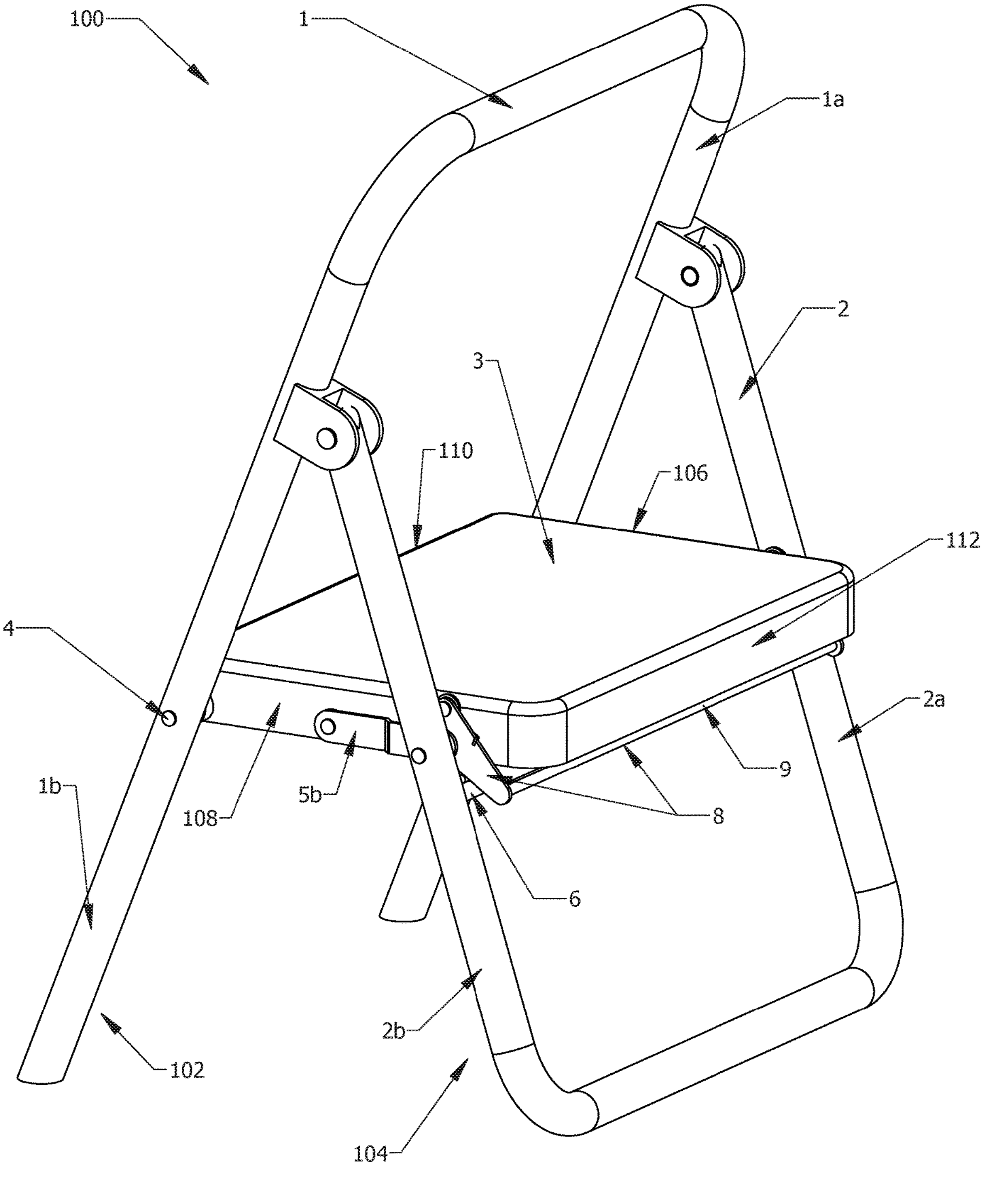
FIG. 1 is an overhead perspective view of the step ladder of the present invention in an open position.
Figure 2:
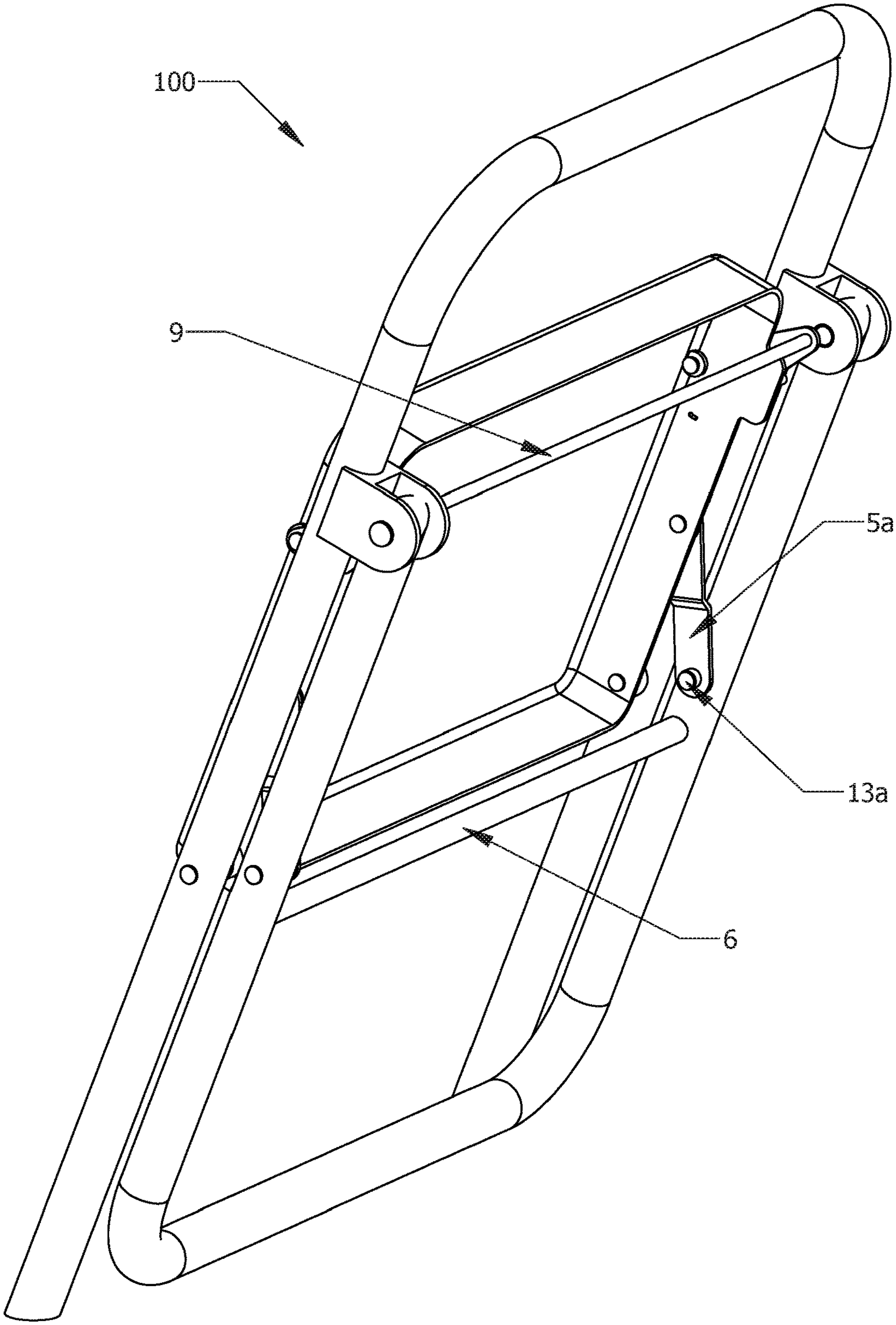
FIG. 2 is an overhead perspective view of the step ladder in a closed position.

Referring now to the drawings wherein like reference numerals refer to similar or identical parts throughout the several views, and more specifically to FIGS. 1 and 2 thereof, there is shown a stepladder 100. The stepladder 100 comprises a front section 102 having a first front leg 1*a* and a second front leg 1*b*. The stepladder 100 comprises a step 3 attached to the first front leg 1*a* and the second front leg 1*b*. The stepladder 100 comprises a latch 8 engaged with the step 3. The stepladder 100 comprises a rear section 104 having a first rear leg 2*a* and a second rear leg 2*b* and a cross bar 6 attached to the first rear leg 2*a* and the second rear leg 2*b*. The rear section 104 is pivotably attached to the front section 102. The rear section 104 has a first stud 13*a* which extends from the first rear leg 2*a* toward the second rear leg 2*b* and separate and apart and not in contact with the second rear leg 2*b* and not in contact with the cross bar 6. The latch 8 is engaged with and latched to the first stud 13*a* to define an engaged position where the first front leg 1*a* and the first rear leg 2*a* are in an open position and form an inverted v shape and are prevented from folding together, and the latch 8 when pulled up from the engaged position, disengages from the first stud 13*a* and allows the front section 102 and rear section 104 to fold together into a closed position where the first rear leg 2*a* and the first front leg 1*a* are in parallel.

Figure 3:
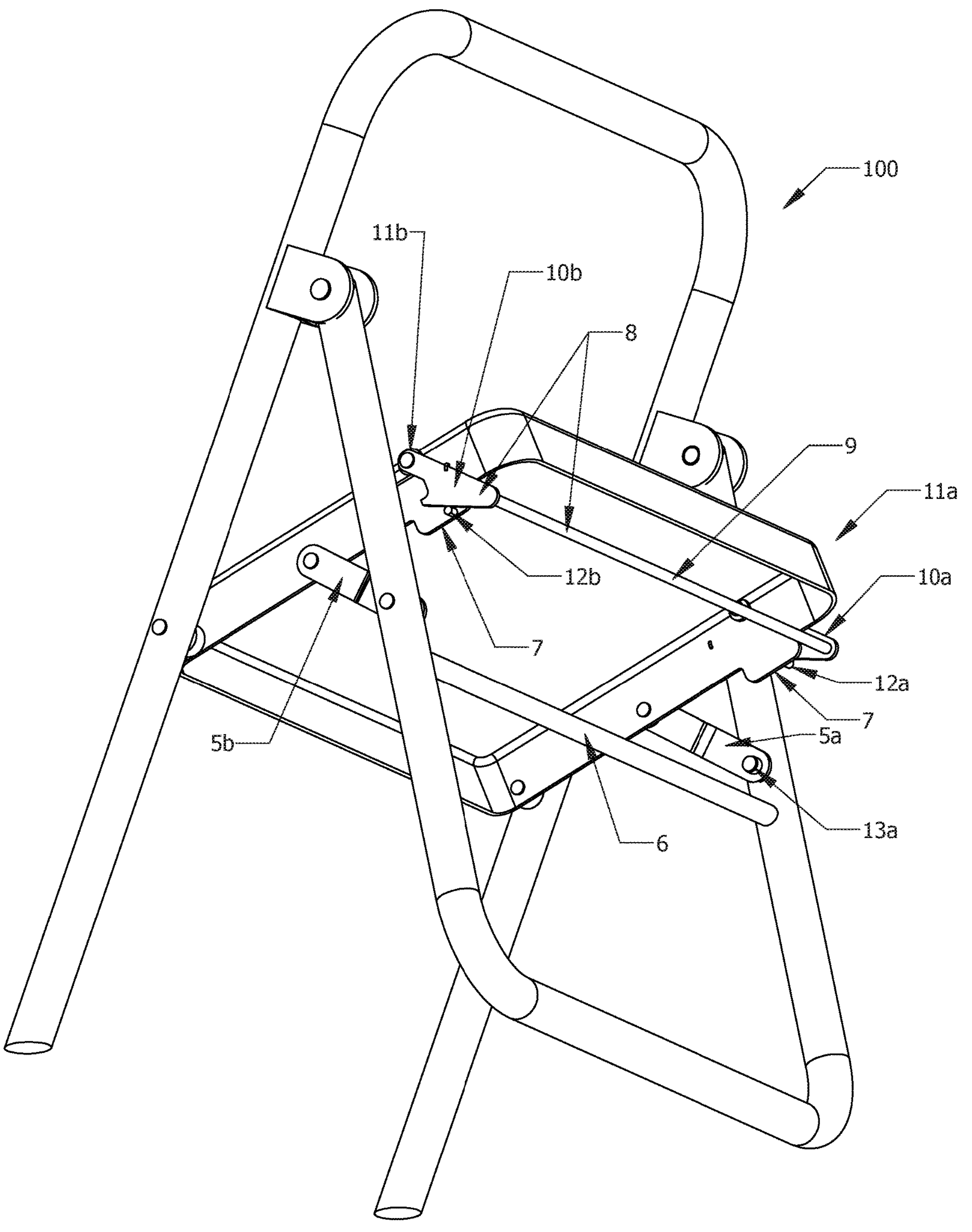
FIG. 3 is an underside perspective view of the stepladder.
Figure 5:
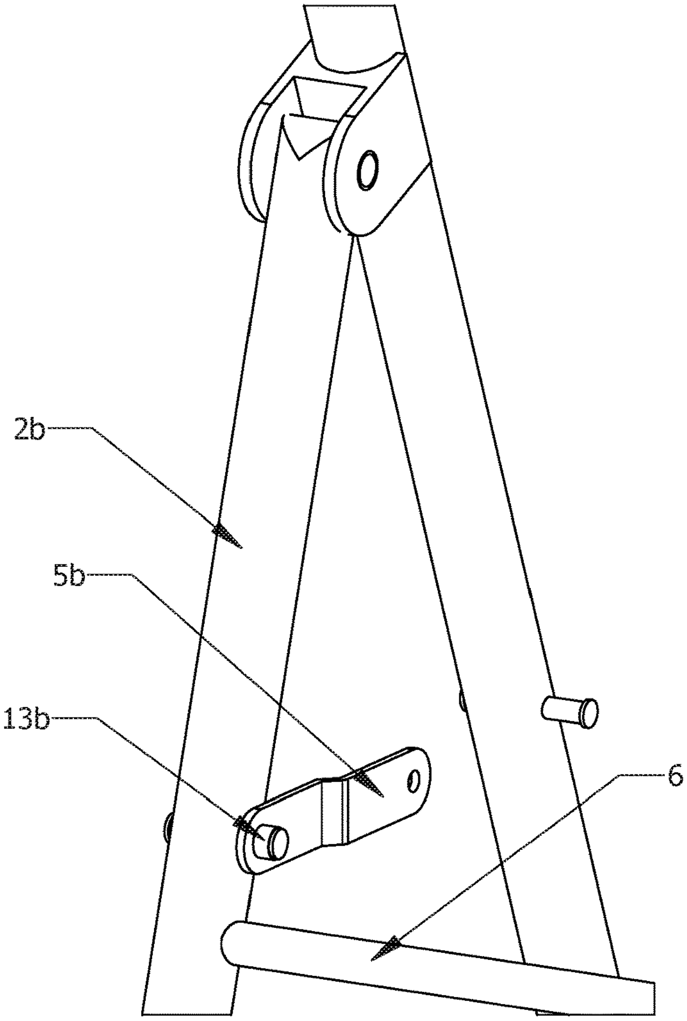
FIG. 5 shows a first front rail and a first rear rail.

The latch 8 may have a first latch end 10*a* that engages with the first stud 13*a* and a second latch end 10*b* that engages with a second stud 13*b* when the latch 8 is in the engaged position, as shown in FIGS. 3 and 5. The rear section 104 may have a second stud 13*b* which extends from the second rear leg 2*b* toward the first rear leg 2*a* and is separate and apart and not in contact with the first rear leg 2*a* and the first stud 13*a* and not in contact with the cross bar 6. The latch 8 may include a latch bar 9 connected to the first latch end 10*a* and the second latch end 10*b* which causes movement of the first and second latch ends 10*a*, 10*b* to occur in unison. The latch bar 9 may be disposed below the step 3 when the latch 8 is in the engaged position. The latch 8 may include a restoring mechanism which moves the first and second latch end 10*a*, 10*b* which causes movement of the first and second latch ends 10*a*, 10*b* to occur in unison. The latch bar 9 may be disposed below the step 3 when the latch 8 is in the engaged position. The latch 8 may include a restoring mechanism which moves the first and second latch ends 10*a*, 10*b* into engagement with the first and second studs 13*a*, 13*b*, respectively, from a disengaged position of the latch 8 when the first and second latch ends 10*a*, 10*b* do not engage the first and second studs 13*a*, 13*b*, respectively. The restoring mechanism may include a first spring 11*a* which engages with the first latch end 10*a* and a second spring 11*b* which engages with the second latch end 10*b*.

Figure 8:
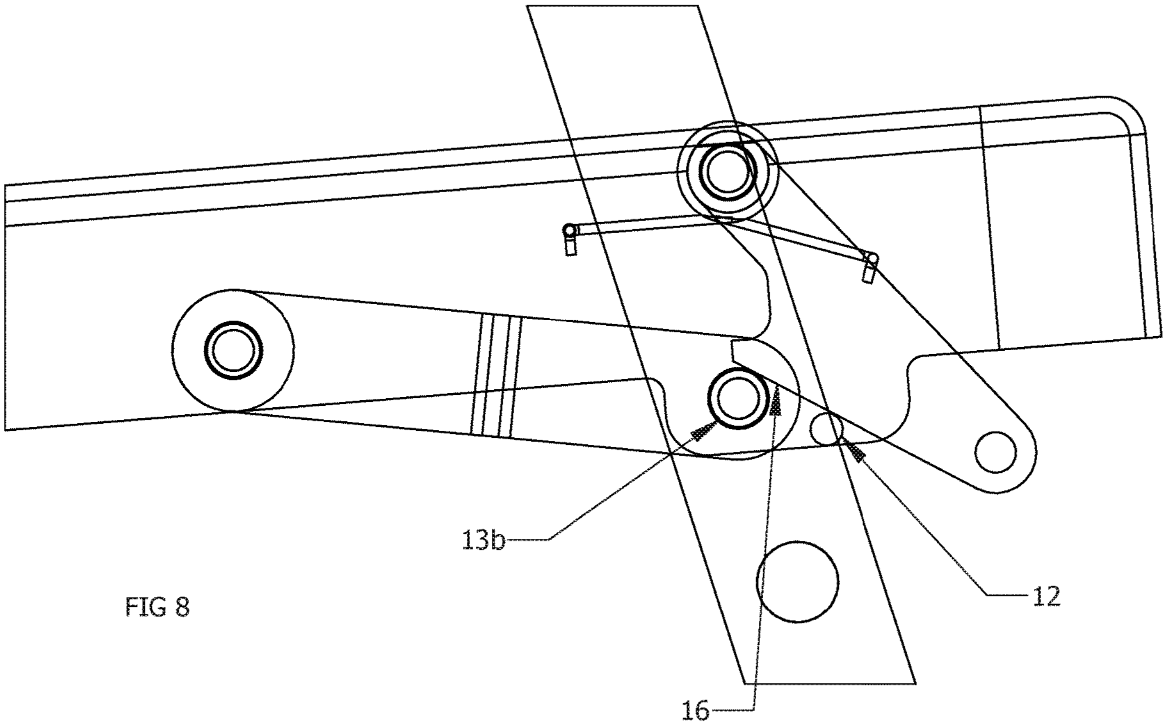
FIG. 8 is a side view of the step and latch end.

The step 3 may include a first side 106, a second side 108, a front 110 and a rear 112, and including a first step link 5*a* attached to the first rear leg 2*a* and the first side 106 of the step 3; and a second step link 5*b* attached to the second rear leg 2*b* and the second side 108 of the step 3. The crossbar may support the rear 112 of the step 3 when the latch 8 is in an engaged position. Each latch end may have a cam portion 16, as shown in FIG. 8. As the cam portion 16 contacts the respective stud when the rear 112 of the step 3 is moved downward, the cam portion 16 moves so that a hook portion 14 of the latch end, shown in FIG. 6, bypasses the respective stud until the hook portion 14 clears the respective stud, at which point the respective spring moves the hook portion 14 to engage the respective stud and place the latch 8 into the engaged position.

The step 3 may include a first stop 12*a* disposed on the first side 106 of the step 3 and a second stop 12*b* disposed on the second side 108 of the step 3, as shown in FIG. 3, which prevent the latch 8 from rotating beyond a desired position. Each hook portion 14 of each latch 8 may be disposed beneath the respective stud and held there by torque supplied by the respective spring. The first stud 13*a* may not support the step 3. The stepladder 100 may include a latch pivot 20 which extends through a latch end and a boss 120 on the step 3 and about which the coil section of the spring is positioned.

The present invention pertains to a method of positioning a stepladder 100. The method comprises the steps of pivoting a front section 102 having a first front leg 1*a* and a second front leg 1*b* relative to a rear section 104 having a first rear leg 2*a* and a second rear leg 2*b* and a cross bar 6 attached to the first rear leg 2*a* and the second rear leg 2*b* to an open position. The rear section 104 has a first stud 13*a* which extends from the first rear leg 2*a* toward the second rear leg 2*b* and is separate and apart and not in contact with the second rear leg 2*b* and not in contact with the cross bar 6. There is the step of engaging a latch 8 to the first stud 13*a* to define an engaged position where the first front leg 1*a* and the first rear leg 2*a* are in an open position and form an inverted v shape and are prevented from folding together. The latch 8 is engaged with a step 3 and the step 3 is attached to the first front leg 1*a* and the second front leg 1*b*. There is the step of pulling up on the latch 8 from the engaged position to disengage the latch 8 from the first stud 13*a*. There is the step of folding the front section 102 and rear section 104 together into a closed position where the first rear leg 2*a* and the first front leg 1*a* are in parallel.

There may be the steps of contacting the first stud 13*a* with a cam portion 16 of a first latch end 10*a* of the latch 8; moving the cam portion 16 so that a hook portion 14 of the first latch end 10*a* bypasses the first stud 13*a*; and moving the hook portion 14 clockwise to engage the first stud 13*a* and place the latch 8 into the engaged position after the hook portion 14 clears the first stud 13*a*.

In the operation of the invention, the following describes the design and operation of the disclosed latch 8 as applied to the simplified single-step folding stepladder seen in FIGS. 1, 2, and 3. It should be understood that this latch 8 design could also be applied to folding stepladders having multiple steps.

FIG. 1 shows the stepladder in the open position. Front legs 1 are hinged to the rear legs 2. A step 3 is attached to the front legs 1 by rivets 4 so that the step 3 can pivot to a closed position seen in FIG. 2. Step links 5 are pivotally connected to the step 3 and to the rear legs 2. The step links cause the rear legs to move to a position parallel to the front legs when the stepladder is folded.

A cross bar 6 is rigidly attached to the rear legs 2. The cross bar 6 provides added stiffness to the rear legs and supports the rear 112 of the step 3 when in the open position by way of projections 7 on the underside of the step 3 which contact the cross bar 6. This can be seen in FIG. 6.

Figure 4:
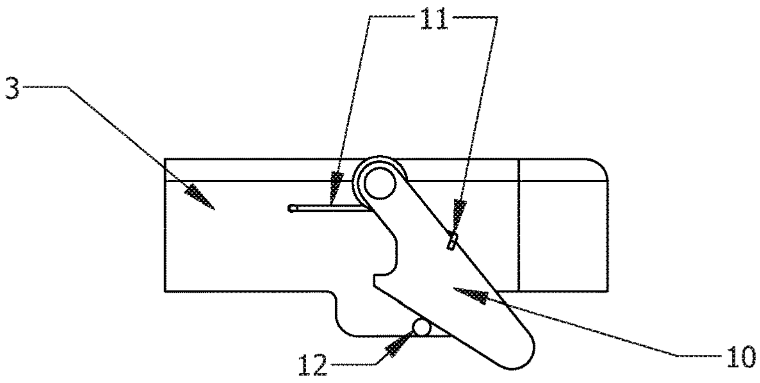
FIG. 4 is a side view of the step and latch end.

A symmetric latch 8 is pivotally attached to the sides of the step 3. The latch 8 consists of a latch bar 9 and two latch ends 10. This is seen in FIG. 3. Springs 11 are symmetrically mounted at both ends of the latch 8 in such a way as to apply a torque to the latch 8. The torque is in a CW direction when seen in FIG. 4, which is a view with the rear legs, etc, removed for clarity. Stops 12 on both sides of the step 3 (FIGS. 3 & 4) prevent the latch 8 from rotating CW beyond the position shown in FIG. 4.

Figure 11:
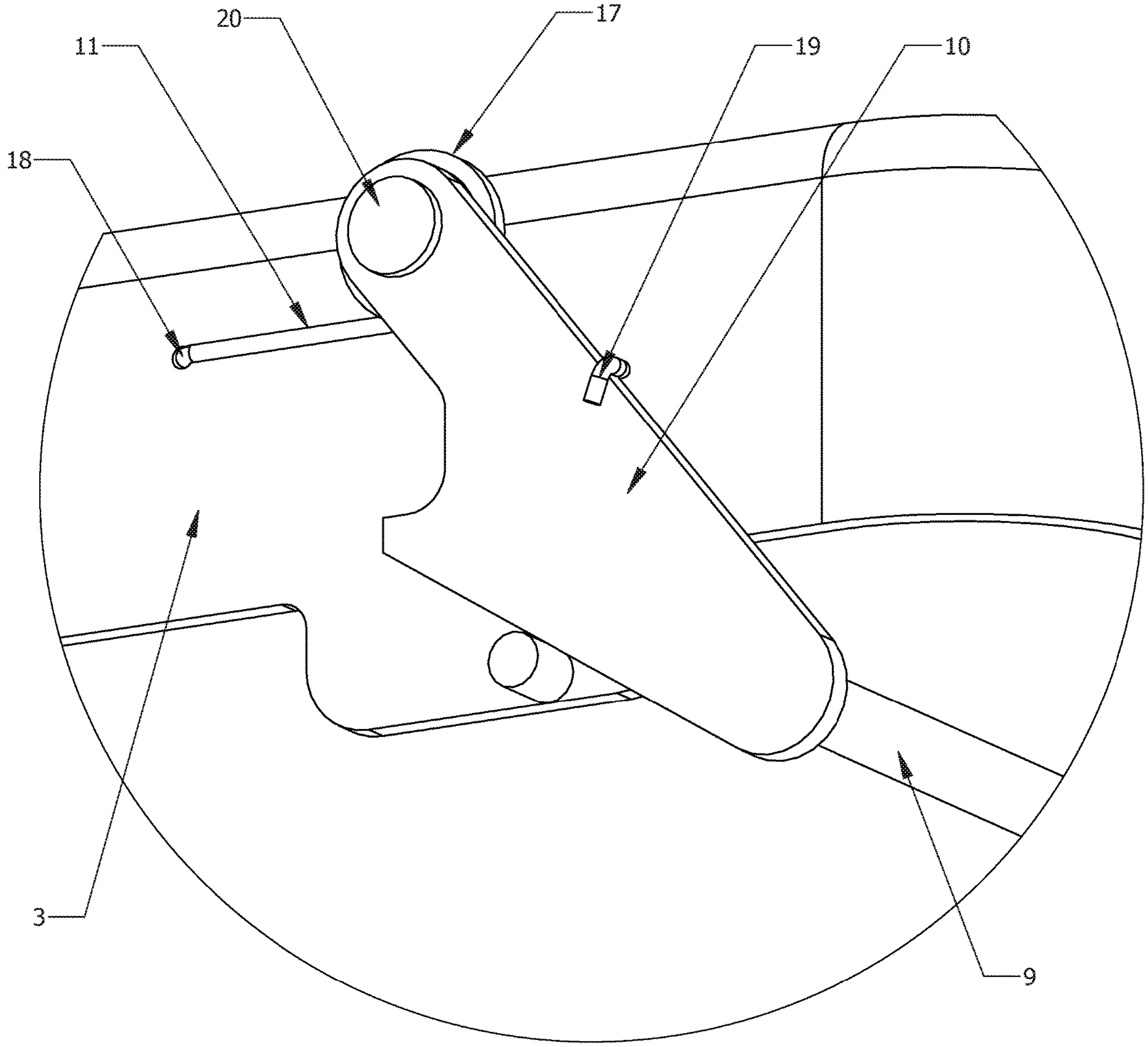
FIG. 11 shows the step and latch end.
Figure 12:
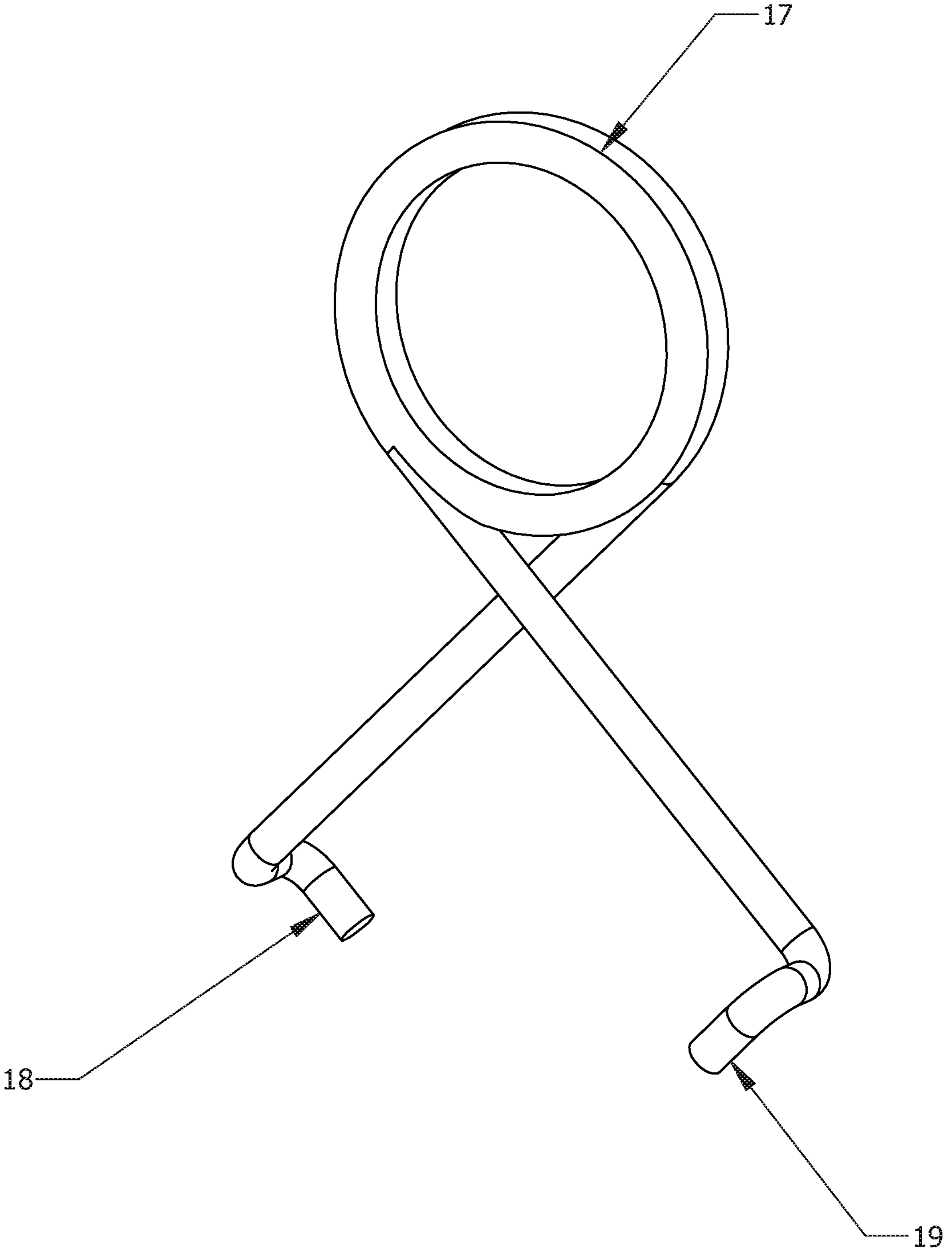
FIG. 12 shows the spring.
Figure 13:
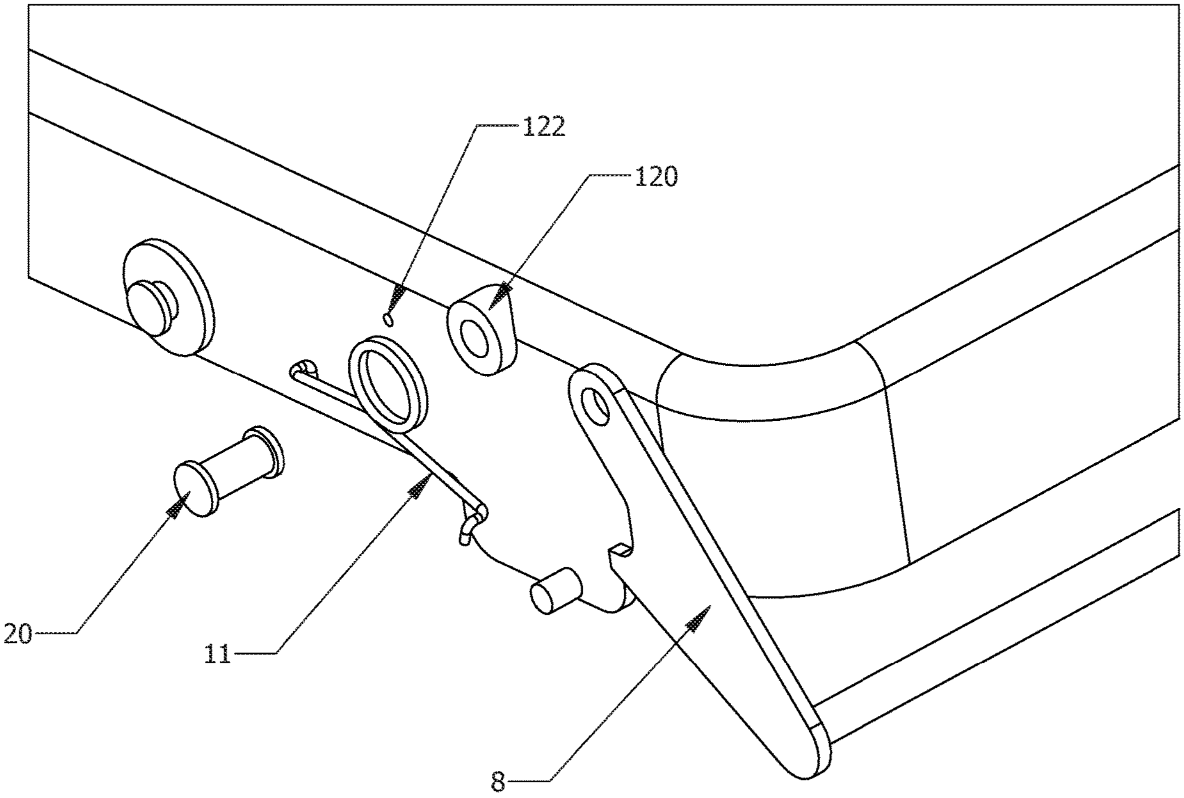
FIG. 13 shows the assembly of the latch end and step.

Additional details of the springs 11 and their mounting can be seen in FIG. 11. In this Figure the rear legs and step link are not shown. The springs 11 consists of a coiled section 17 and two ends and is similar to the torsion spring of a common clothes pin. (FIG. 12 shows the spring in its relaxed state.) The coiled section 17 is installed concentric with the latch pivot 20. The fixed end 18 is hooked into a hole 122 in the step 3 and the moving end 19 is hooked over the latch end 10. By comparing FIG. 6 and FIG. 7 it can be seen that when the latch 8 is moved toward the unlatched position, the fixed end 18 does not move but the moving end 19 moves with the latch 8 and biases the latch back toward the latched position. The latch pivot 20 is a rivet which extends through a latch end 10 and a boss 120 on the step 3 and about which the coil section 17 of the spring 11 is positioned."

Two studs 13 (seen in FIGS. 2, 3, & 5) serve to attach the step links 5 to the rear legs 2 and provide engagement points for the latch 8. In FIG. 5 the step 3 has been removed to show one stud 13 more clearly. The studs 13 do not support the step 3 in any way.

Note, FIGS. 6, 7, 8, & 9 are phantom views with components shown "wireform". These views show the right side of the stepladder but it should be understood that the stepladder and all its latch components are symmetric about the center plane.

Figure 6:
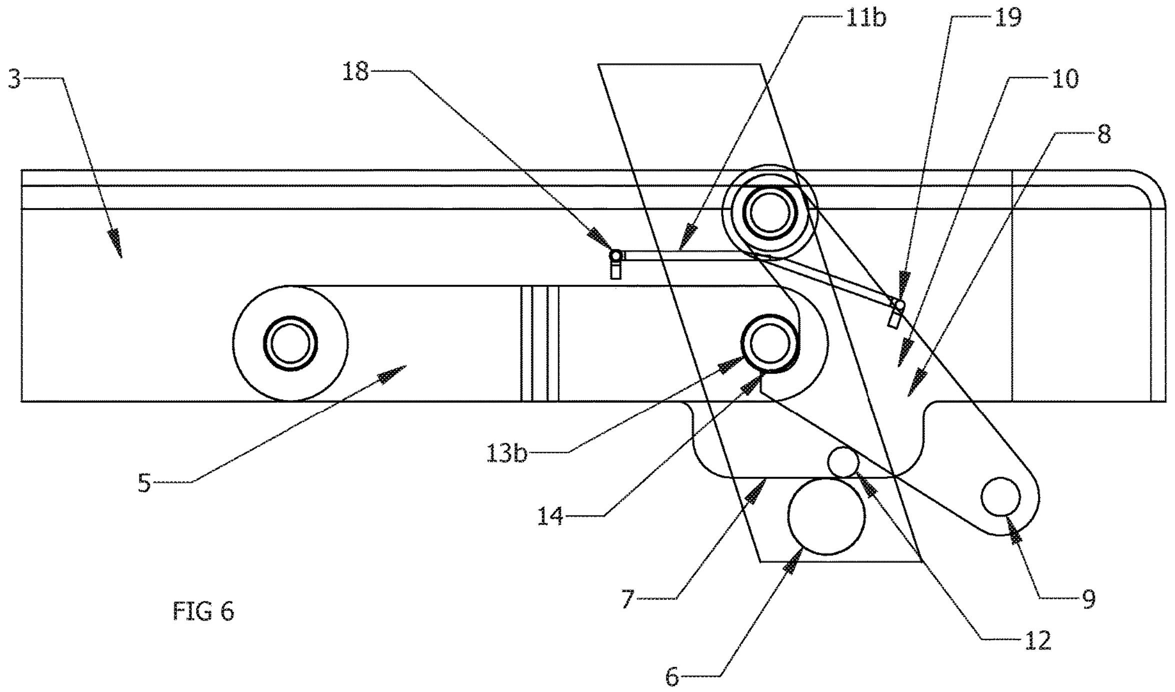
FIG. 6 is a side view of the step and latch end.
Figure 10:
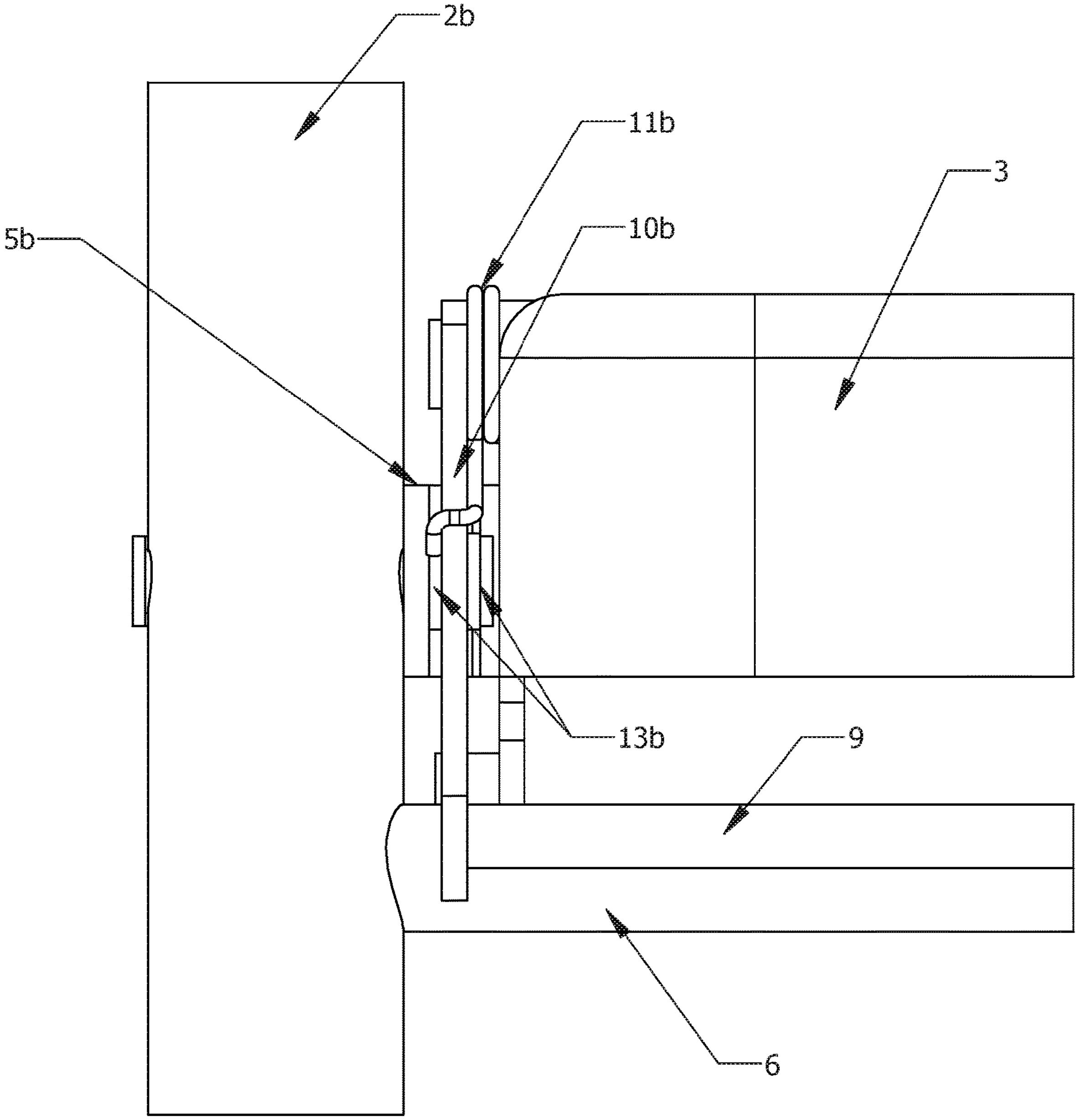
FIG. 10 shows the step and latch end.

FIG. 6 shows the stepladder when fully opened and the latch 8 in the fully engaged position. The hook 14 portion of the latch end 10 is beneath the stud 13 and held there by the torque supplied by the spring 11. In this position the latch positively prevents the stepladder from folding. FIG. 10 is a closeup of the right side latch components as seen from the rear 112 when the latch is fully engaged.

Figure 7:
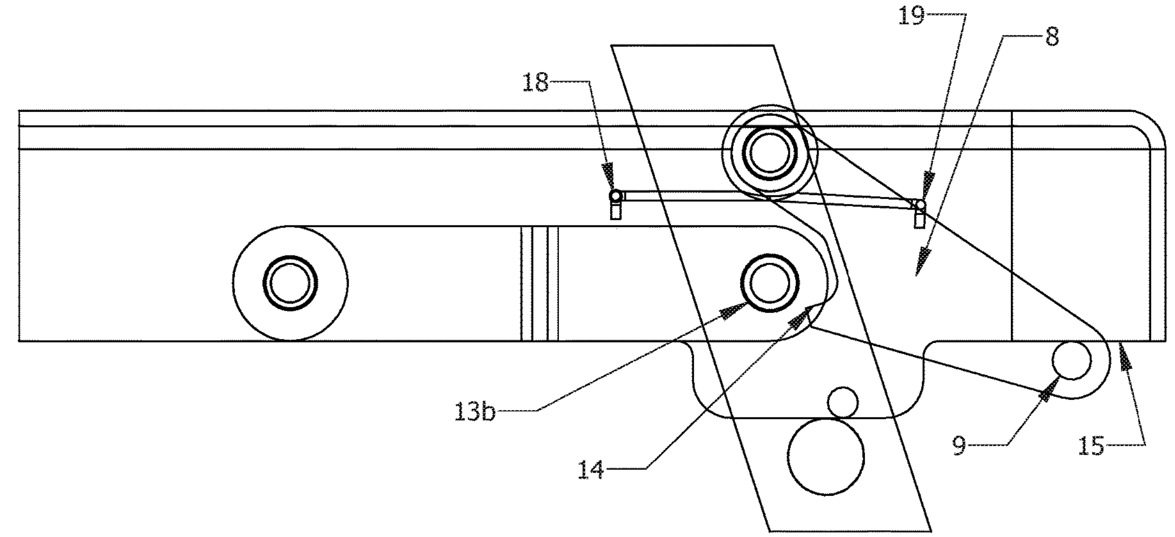
FIG. 7 is a side view of the step and latch end.

FIG. 7 shows how the latch 8 is disengaged from the stud 13 in order to fold the stepladder. The user reaches under the rear 112 of the step 3 and lifts up on the latch bar 9 of the latch 8. The latch 8 will rotate against spring 11 torque until the latch bar 9 contacts the underside 15 of the step 3. By that time the hook 14 portion of the latch end 10 has disengaged from the stud 13. The user can then lift up the rear 112 of the step 3 to fold the stepladder. Once the rear 112 of the step 3 has risen a short distance the user may allow the latch 8 to return to the position seen in FIGS. 3 & 4.

Figure 9:
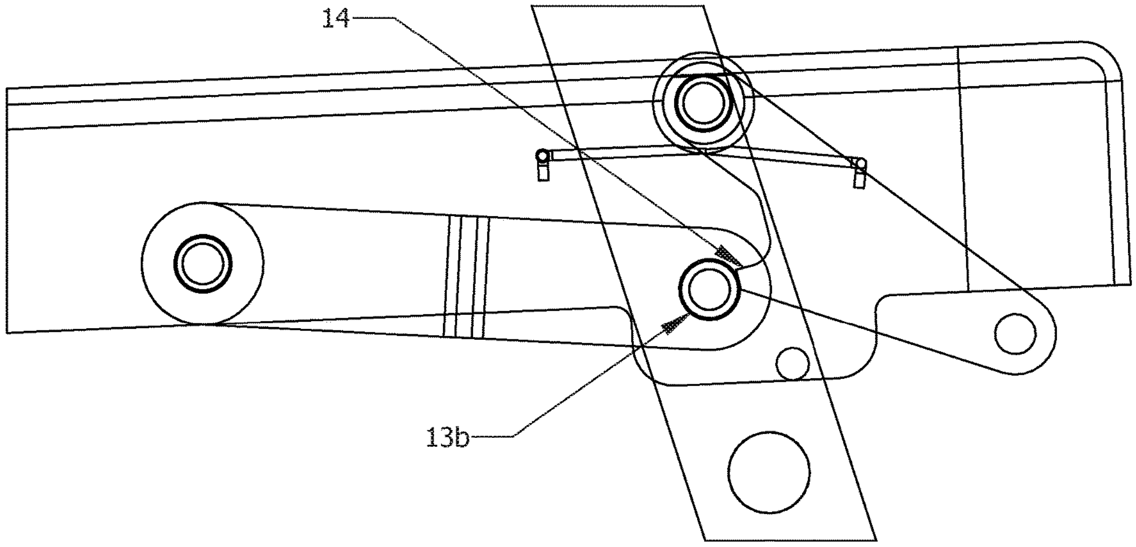
FIG. 9 is a side view of the step and latch end.

To move the stepladder to its open and latched position the user pushes the rear edge of the step 3 rearward and downward. FIG. 8 shows the cam 16 portion of the latch 8 as it contacts the stud 13. Continued downward motion of the rear edge of the step 3 causes the latch 8 to rotate CCW (as viewed) so that its hook 14 portion is able to bypass the stud 13 as seen in FIG. 9. As seen in FIG. 6, when the projections 7 on the step 3 contact the cross bar 6, the latch 8 returns under spring 11 torque to its fully engaged position. The user is assured that the latch is engaged by hearing and feeling it snap into its engaged position.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus comprising:

a platform;

a latch engaged with the platform; and a leg section having a first leg and a second leg, the leg section pivotably attached to the platform, the leg section having a first stud which extends from the first leg toward the second leg, the first stud being separate and apart and not in contact with the second leg, the latch engaged with and latched to the first stud to define an engaged position, and the latch, when pulled up from the engaged position, disengages from the first stud to allow the leg section to pivot with respect to the platform into a closed position, wherein a boss projects outwardly from a first side wall of the platform towards the first leg, a latch pivot extends through an end of the latch and through the boss, and a coil section of a spring is positioned about the boss, the spring having a first end fixed to the side wall and a second end fixed to the latch and biasing the latch towards the engaged position, wherein the latch has a cam portion that contacts the first stud and moves so that a hook portion of the latch bypasses the first stud until the hook portion clears the first stud.

2. The apparatus of claim 1 wherein the leg section has a second stud which extends from the second leg toward the first leg, the second stud being separate and apart and not in contact with the first leg, and wherein the latch has a first latch end that engages with the first stud and a second latch end that engages with the second stud when the latch is in the engaged position.

3. The apparatus of claim 1 wherein the leg section has a second stud which extends from the second leg toward the first leg, the second stud being separate and apart and not in contact with the first leg, wherein the leg section includes a cross bar attached to the first leg and the second leg, wherein the first stud and the second stud are not in contact with the cross bar, and wherein the latch includes a latch bar connected to a first latch end and a second latch end of the latch and disposed below the platform when the latch is in the engaged position, the latch bar configured to cause unison movement of the first and second latch ends.

4. The apparatus of claim 1 wherein the spring is a torsion spring that moves the latch into engagement with the first stud from a disengaged position of the latch.

5. The apparatus of claim 1 wherein the spring is a torsion spring.

6. The apparatus of claim 1 further comprising:

a front section pivotably attached to the leg section, the front section having a third leg and a fourth leg; and a crossbar attached to the first leg and the second leg, wherein the platform is attached to the third leg and the fourth leg, includes the first side wall, a second side, a front, and a rear, and includes a first link and a second link, the first link attached to the first leg and the first side wall and the second link attached to the second leg and the second side, and wherein the crossbar supports the rear of the platform when the latch is in the engaged position.

7. The apparatus of claim 1 wherein after the hook portion clears the first stud, the spring moves the hook portion to engage the first stud and place the latch into the engaged position.

8. The apparatus of claim 1 wherein the platform includes a first stop disposed on the first side wall of the platform and a second stop disposed on a second side of the platform which prevent the latch from rotating beyond a desired position.

9. The apparatus of claim 1 wherein the latch includes the hook portion held beneath the first stud by torque supplied by the spring.

10. The apparatus of claim 1, wherein a first link is rotatably attached to the first leg via the stud, the first link rotatably attaching the first leg to the first side wall of the platform.

11. An apparatus comprising:

a platform having a longitudinal axis;

a first leg assembly rotatably attached to the platform, the first leg assembly having:

a first leg, and a second leg in spaced relationship and in parallel with the first leg, wherein the first leg assembly rotates between an extended position and a folded position about a first leg assembly pivot axis;

a latch assembly coupled to the platform and rotatable into a secured position; and a stud attached to and extending partially away form the first leg without contacting the second leg, wherein rotation of the latch assembly into the secured position engages the stud with the latch assembly when the first leg assembly is moved into the extended position, wherein, when the latch assembly is moved out of the secured position by a pressing force against the latch assembly, the stud disengages from the latch assembly and the first leg assembly is free to rotate around the first leg assembly pivot axis, wherein a first link is rotatably attached to the first leg via the stud, the first link rotatably attaching the first leg to a side wall of the platform.

12. The apparatus of claim 11 wherein the latch assembly includes a latch hook that engages with the stud.

13. The apparatus of claim 12 wherein the latch assembly includes a latch pivot about which the latch hook rotates from the secured position.

14. The apparatus of claim 11 wherein the latch assembly includes a latch actuator that moves the latch assembly out of the secured position when the pressing force is applied to the latch actuator.

15. The apparatus of claim 11 wherein the latch assembly includes a latch hook that engages with the stud and extends towards a middle of the platform.

16. The apparatus of claim 11 wherein the latch assembly includes a latch spring that biases the latch assembly in the secured position by applying a restoring force to automatically move the latch assembly back to the secured position after the latch assembly has been moved from the secured position.

17. The apparatus of claim 11 wherein the latch assembly includes a latch hook, wherein, when the first leg assembly moves to the extended position from the folded position, the stud cams a leading edge of the latch hook, moves the latch hook, advances beyond the leading edge of the latch hook, and then locks in place under a restoring force of a latch spring after clearing the leading edge of the latch hook.

18. The apparatus of claim 11 wherein the stud has a circular cross section.

19. The apparatus of claim 11 wherein the latch assembly has a cam portion that contacts the stud and moves so that a hook portion of the latch bypasses the stud until the hook portion clears the stud.

20. The apparatus of claim 11, wherein a boss projects outwardly from a side wall of the platform towards the first leg, a latch pivot extends through an end of the latch and through the boss, and a coil section of a spring is positioned about the boss, the spring having a first end fixed to the side wall and a second end fixed to the latch and biasing the latch towards the secured position.

* * * * *